US010008838B1

(12) United States Patent
Rhodes et al.

(10) Patent No.: US 10,008,838 B1
(45) Date of Patent: Jun. 26, 2018

(54) CABLE PULLING DEVICE

(71) Applicants: Robert C. Rhodes, Punta Gorda, FL (US); Kyle J. Rhodes, Punta Gorda, FL (US)

(72) Inventors: Robert C. Rhodes, Punta Gorda, FL (US); Kyle J. Rhodes, Punta Gorda, FL (US)

( * ) Notice: Subject to any disclaimer, the term of this patent is extended or adjusted under 35 U.S.C. 154(b) by 0 days. days.

(21) Appl. No.: 15/486,780

(22) Filed: Apr. 13, 2017

(51) Int. Cl.
*H02G 1/08* (2006.01)
*B66D 1/12* (2006.01)
*B66D 1/74* (2006.01)
*H02G 11/02* (2006.01)

(52) U.S. Cl.
CPC ............ *H02G 1/088* (2013.01); *B66D 1/12* (2013.01); *B66D 1/7447* (2013.01); *B66D 1/7457* (2013.01); *B66D 1/7489* (2013.01); *H02G 1/08* (2013.01); *H02G 11/02* (2013.01)

(58) Field of Classification Search
CPC .......... H02G 1/088; H02G 11/02; H02G 1/08; B66D 1/7457; B66D 1/7489; B66D 1/7447; B66D 1/12
USPC .......................... 254/134.3 FT, 134.3 R, 323
See application file for complete search history.

(56) References Cited

U.S. PATENT DOCUMENTS

| 4,204,664 | A | * | 5/1980 | Bryan, Jr. ............... B66C 23/72 212/197 |
| 4,884,783 | A | * | 12/1989 | McIntosh ................. B66D 1/14 254/343 |
| 5,238,225 | A | | 8/1993 | Hunt |
| 5,551,545 | A | * | 9/1996 | Gelfman ................. H02G 11/02 191/12.2 A |
| 5,653,293 | A | | 8/1997 | Ellis |
| 5,711,636 | A | | 1/1998 | Boyer |
| 6,073,917 | A | * | 6/2000 | Plummer ............. B66D 1/7447 242/602.2 |
| 6,125,425 | A | | 11/2000 | Boyer |
| 6,152,425 | A | * | 11/2000 | Boyer ..................... B66C 23/66 212/232 |
| 6,553,694 | B2 | * | 4/2003 | Martinez .................. B66D 1/00 37/403 |
| 6,578,823 | B1 | | 6/2003 | Johnson |
| 6,672,568 | B1 | | 1/2004 | Rawlinson |

(Continued)

FOREIGN PATENT DOCUMENTS

GB          1476311          *   6/1977

OTHER PUBLICATIONS

Current Tools Mobile Cable Pulling System; www.currenttools.com.*

(Continued)

*Primary Examiner* — Christopher M Koehler
*Assistant Examiner* — Mahdi H Nejad
(74) *Attorney, Agent, or Firm* — Edward M. Livingston, Esq.; Bryan L. Loeffler, Esq.; Livingston Loeffler, P.A.

(57) ABSTRACT

A cable pulling device (1) having a capstan (6) extending from one side of a housing (11) that attaches to a boom (10) of a backhoe (5) via a quick coupling (8). The capstan is located on an external side of the housing in an offset and exposed manner that allows a rope (19) to be wrapped over and/or around the capstan. By pulling on the rope, an operator is able to control tension on the capstan, thereby allowing the capstan to provide a pulling force on the cable or one or more electrical wires being pulled through the conduit.

8 Claims, 3 Drawing Sheets

(56) References Cited

U.S. PATENT DOCUMENTS

| | | | | |
|---|---|---|---|---|
| 6,712,338 B2 * | 3/2004 | Schafer | | B66D 1/7426 254/335 |
| 6,830,235 B2 * | 12/2004 | Stafford | | B66D 1/7447 254/332 |
| 8,302,936 B2 * | 11/2012 | Plummer | | B66D 1/36 254/134.3 FT |
| 8,511,438 B1 | 8/2013 | Waldschmitt | | |
| 9,048,708 B2 * | 6/2015 | Cloran | | H02K 5/10 |
| 2007/0045601 A1 * | 3/2007 | Rhee | | A01K 79/02 254/383 |
| 2007/0125993 A1 * | 6/2007 | Plummer | | B66D 1/7447 254/357 |
| 2008/0111115 A1 * | 5/2008 | Jeong | | H02G 1/08 254/134.3 R |
| 2008/0143201 A1 * | 6/2008 | Ramy | | H02K 5/15 310/59 |
| 2008/0203370 A1 * | 8/2008 | Ball | | B66D 1/7415 254/372 |
| 2009/0260265 A1 | 10/2009 | Aeschbacher et al. | | |
| 2010/0102287 A1 * | 4/2010 | Kohlenberg | | B66D 1/16 254/266 |
| 2011/0175043 A1 * | 7/2011 | Lehoczky | | B66D 1/12 254/277 |
| 2012/0222510 A1 * | 9/2012 | Winther | | F16H 25/20 74/89.23 |
| 2014/0169928 A1 * | 6/2014 | Lundman | | B66D 1/60 414/800 |
| 2015/0263575 A1 * | 9/2015 | Pace | | B66D 1/12 166/355 |

OTHER PUBLICATIONS

Ultra Tugger Cable Puller and Pulling System 99966174 REV 4; www.greenlee.com; © 2015 Greenlee Textron Inc.*

Ultra-Tugger-AdapterPackage-Manual; © 2007 Greenlee Textron Inc.*

* cited by examiner

CABLE PULLING DEVICE

FIELD OF THE INVENTION

This invention relates to electrical conduit and more particularly, a device that attaches to a backhoe and assists an individual with manually pulling electrical wire or cable through an underground electrical conduit.

BACKGROUND OF THE INVENTION

Power is commonly supplied to structures through electrical wires buried in the ground and protected by conduit. The conduit is first buried at a required depth using a backhoe and then wires are pulled through the conduit using a rope that has been fished through the conduit and attached to one end of the electrical wires. For smaller applications, such as in residential settings, the wires may be pulled by hand. However, in larger applications, such as in commercial settings, the wires must be pulled using a mechanical winch.

There are problems and/or dangers when using a conventional winch to pull wires through conduit. One problem is the size of the winches which must be mounted to a truck or to a trailer. In many cases, a conventional winch mounted to a truck or trailer cannot readily access the work site. An additional problem, is the need for extra workers to transport not only a backhoe, which is transported on a trailer, but also the winch, which is transported on a second truck and/or trailer. This requires two transport vehicles or multiple trips to transport the backhoe and the winch to a jobsite.

A more concerning problem with conventional winches is the damage that may be caused to the wires, conduit and/or junction boxes into which the conduit is fed. Many junction boxes, especially in commercial settings are mounted on a concrete foundation through which one or more lines of conduit pass through from the ground below. It is often difficult for an individual operating a winch to monitor the progress of the cable and electrical wires being pulled through the conduit. This is especially true when the winch must be placed a distance from the junction box due to inaccessibility. As a result, the force of the winch may pull the electrical wires too far through the conduit, thereby damaging the wires and/or conduit and, in some cases, actually pulling the junction box and concrete foundation up and off the ground.

Therefore, a need exists for a cable pulling device that is easily transportable and allows an operator more control over the tension being applied to the cable and electrical wires being pulled though a conduit.

The relevant prior art includes the following references:

| Pat. No. (U.S. Patent References) | Inventor | Issue/ Publication Date |
| --- | --- | --- |
| 5,238,225 | Hunt | Aug. 24, 1993 |
| 5,653,293 | Ellis | Aug. 5, 1997 |
| 5,711,636 | Boyer | Jan. 27, 1998 |
| 6,125,425 | Boyer | Nov. 28, 2000 |
| 6,553,694 | Martinez | Apr. 29, 2003 |
| 2009/0260265 | Aeschbacher et al. | Oct. 22, 2009 |

SUMMARY OF THE INVENTION

The primary objects of the present invention is to provide a cable pulling device that is easily transportable and allows an operator more control over the tension being applied to the cable and electrical wires being pulled though a conduit.

The present invention fulfills the above and other objects by providing a cable pulling device that attaches to a boom of a backhoe via an attachment mechanism, such as a quick coupling. A hydraulic motor is secured within a housing and powered by the hydraulics of the backhoe. A capstan or pulley wheel is located on an external side of the housing in an exposed manner that allows a rope to be wrapped over and/or around the capstan. A distal end of the rope is attached to cable or electrical wires being pulled though conduit and a proximal end of the rope is held by an operator. By pulling on the rope, the operator is able to control the tension on the capstan, thereby allowing the capstan to provide a pulling force on the distal end of the rope. As the operator pulls the rope with the aid of the capstan, the extra rope is coiled by the operator. This is in contrast to conventional winches, in which the rope is wound around a drum located within a housing and/or between two arms, wherein no human interaction is possible to allow the tension on the cable to be controlled other than turning the winch on or off.

In addition, the attachment of the cable pulling device to a backhoe allows for better accessibility by allowing the cable pulling device to be placed close to the junction box and/or end of the conduit so the operator can personally see the cable and electrical wires as such pass through the end of the conduit. This allows the operator to relieve tension on the electrical wires when nearing the end of the pull or to immediately remove tension on the electrical wires if necessary in order to prevent damage from occurring.

The size of the cable pulling device and adaptability thereof allows the cable pulling device to be easily transported with a backhoe, thereby eliminating the need for additional equipment and workers on a job site.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
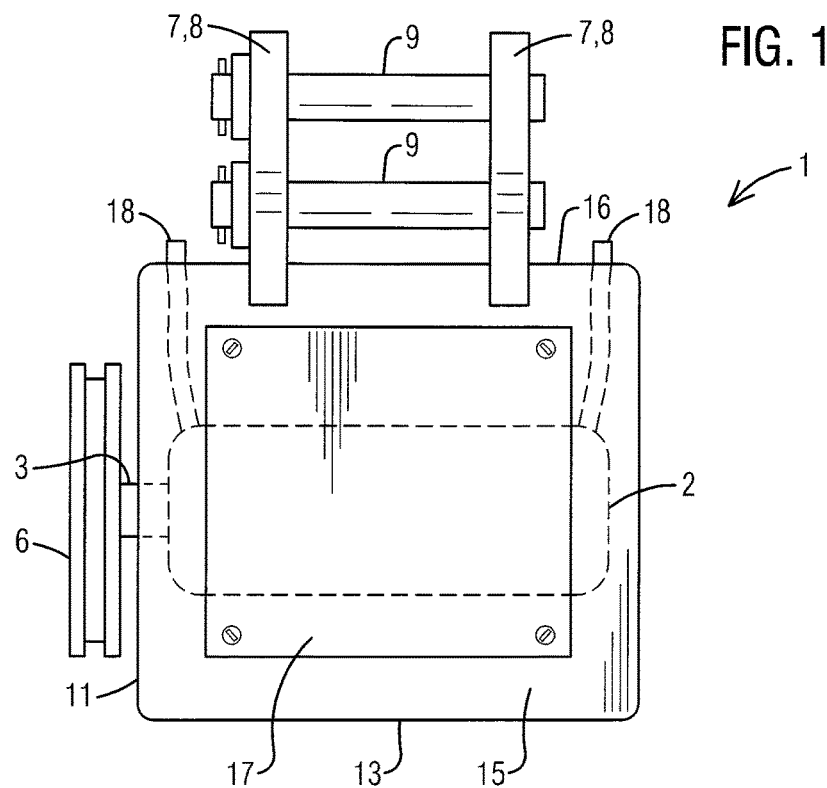
FIG. 1 is a front side plan view of a cable pulling device of the present invention.
Figure 2:
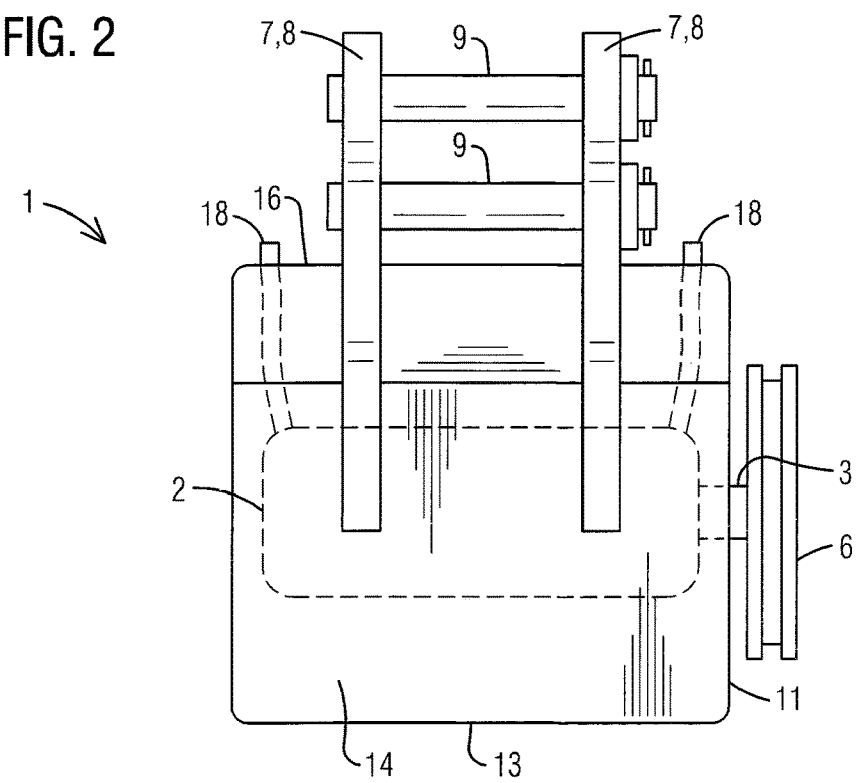
FIG. 2 is a rear side plan view of a cable pulling device of the present invention.
Figure 3:
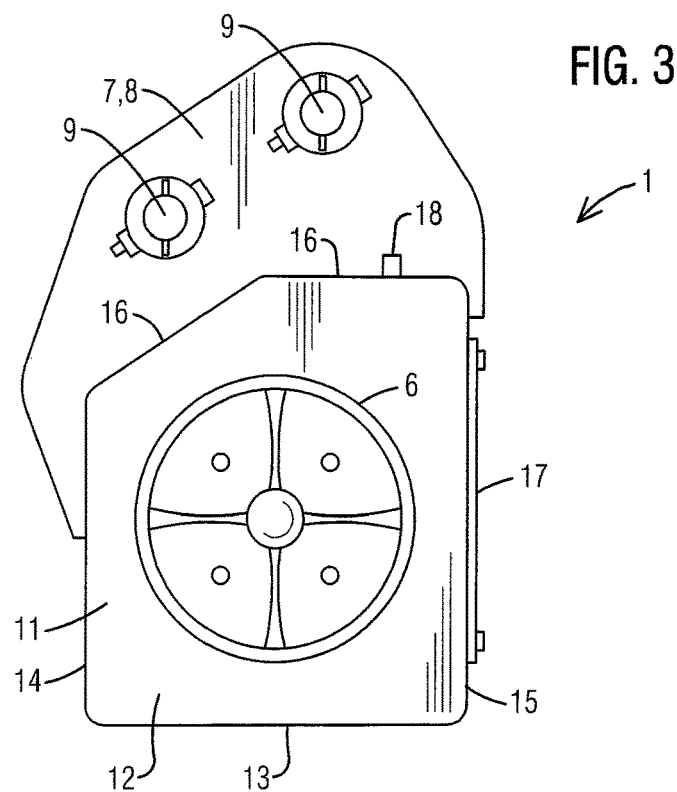
FIG. 3 is a left side view of a cable pulling device of the present invention.
Figure 4:
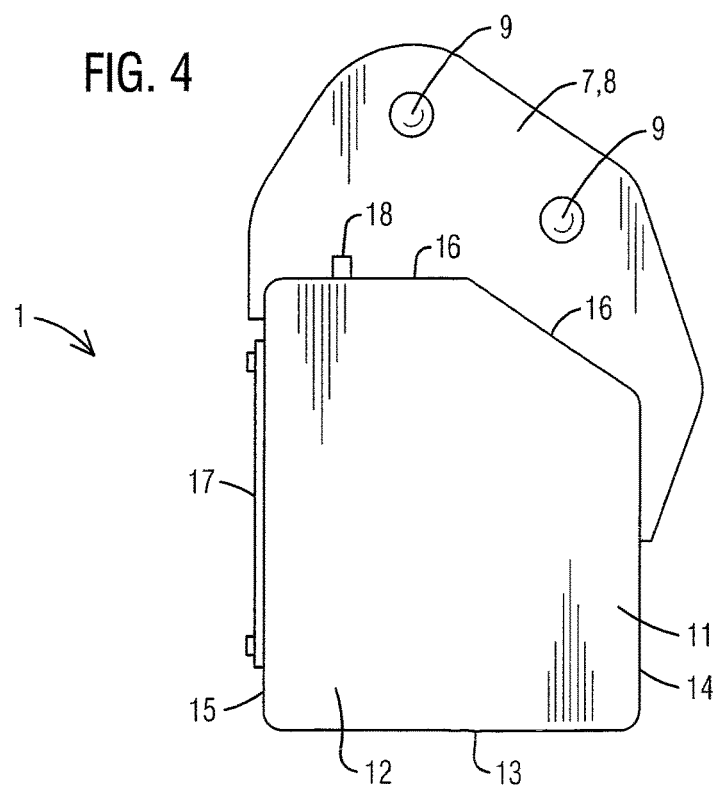
FIG. 4 is a right side view of a cable pulling device of the present invention.

For purposes of describing the preferred embodiment, the terminology used in reference to the numbered accessories in the drawings is as follows:

1. cable pulling device, generally
2. motor
3. drive shaft
4. hydraulic system 5. backhoe
6. capstan
7. attachment means
8. coupling
9. cross member
10. boom
11. housing
12. side panel of housing
13. bottom panel of housing
14. rear panel of housing
15. front panel of housing
16. top panel
17. access panel
18. hydraulic fitting
19. rope
20. cable/electrical wire
21. conduit
22. pull direction amount With reference to FIGS. 1-4, a cable pulling device 1 of the present invention is illustrated. The cable pulling device 1 comprises a motor 2 that actuates a drive shaft 3 extending from a side of the motor 2. The motor 2 is preferably a hydraulic motor to allow attachment of the motor 2 to a hydraulic system 4 of a backhoe 5 or equivalent piece of machinery (as illustrates in FIG. 4), thereby allowing for a power supply to the motor 2. The drive shaft 3 is preferably positioned in a horizontal manner and has a capstan 6 mounted thereon that is provided rotational force from the draft shaft 3 and the motor 2. The cable pulling device 1 further comprises an attachment means 7, such as a quick coupling 8 having at least one cross member 9 or equivalent means for attaching the cable pulling device 1 to a boom 10 of a backhoe 5.

As illustrated herein, the motor 2 is contained within a housing 11 comprising two side panels 12, a bottom panel 13, a rear panel 14, a front panel 15 and at least one top panel 16. The drive shaft 3 extends through one of the two side panels 12 so that the capstan 6 is located on the outside of the housing 11. The attachment means 7 is located on the at least one top panel 16. An access panel 17 is located on the housing 11 to provide access to the motor 2. Hydraulic fittings 18 for attaching the motor 2 to a hydraulic system 4 of the backhoe 5 are located on an exterior surface of the housing.

Figure 5:
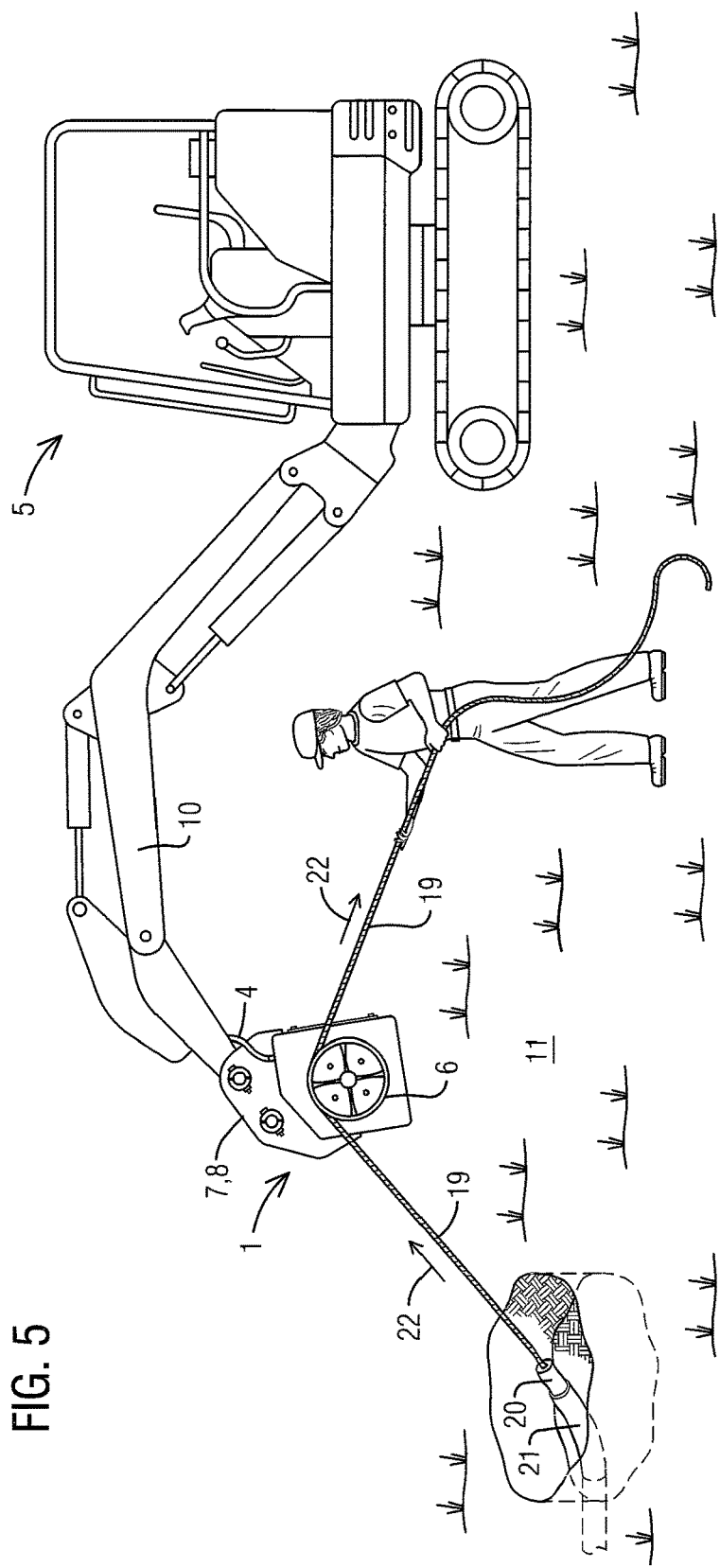
FIG. 5 is a side view of a cable pulling device of the present invention attached to a backhoe and in use.

With reference to FIG. 5, a view of a cable pulling device 1 of the present invention attached to a backhoe 5 and in use is illustrated. The cable pulling device 1 comprises a capstan 6 extending from one side of a housing 11 that attaches to a boom 10 of a backhoe 5 via an attachment means 7, such as a quick coupling 8. The capstan 6 or pulley wheel is located on an external side of the housing 11 exposed and offset from the boom 10 in a position that allows a rope 19 to be wrapped over and/or around the capstan 6. A distal end of the rope 19 is attached to electrical wires 20 being pulled though conduit 21 and a proximal end of the rope 19 is held by an operator. By pulling on the rope 19 in the direction of the arrows 22, the operator is able to control the tension on the capstan 6, thereby allowing the capstan 6 to provide a pulling force on the distal end of the rope 19 or rope. As the operator pulls the rope 19 or rope with the aid of the capstan 6, the extra rope 19 or rope is coiled on the ground by the operator. The operator may remove tension on the rope 19 simply by removing his or her grip thereon, thereby ceasing any pulling force on the electrical wires 20 and conduit 21.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described our invention, we claim:

1. A cable pulling system comprising:
a motor connected to a drive shaft;
said drive shaft extending from a side of said motor and being oriented in a horizontal position;
a capstan located on said drive shaft and actuated via said drive shaft and said motor;
said motor is contained within a housing having a top panel, a bottom panel, a front panel, a rear panel and side panels;
said drive shaft extends from the motor through one of the side panels of the housing to the capstan;
said capstan is located outside of the housing, wherein flat sides of the capstan are in a vertical position parallel to the side panels of the housing;
a coupling fixedly attached to the housing wherein said coupling is located centrally on the housing between the side panels of the housing, thereby placing the capstan in an offset position in relation to the coupling; and
said coupling comprises two cross member rods attached in elevated positions above the housing.

2. The cable pulling system of claim 1, wherein:
said motor is a hydraulic motor.

3. The cable pulling system of claim 1 further comprising:
at least one hydraulic fitting for attaching the motor to a hydraulic system.

4. A cable pulling system comprising:
a motor connected to a drive shaft;
said drive shaft extending from a side of said motor and being oriented in a horizontal position;
a capstan located on said drive shaft and actuated via said drive shaft and said motor;
said motor is contained within a housing having a top panel, a bottom panel, a front panel, a rear panel and side panels;
said drive shaft extends from the motor through one of the side panels of the housing to the capstan;
said capstan is located outside of the housing in a vertical position parallel to the side panels of the housing;
a coupling fixedly attached to the housing wherein said coupling is located centrally on the housing between the side panels of the housing, thereby placing the capstan in an offset position in relation to the coupling; and
a boom attached to the coupling and extending away from the housing and the coupling.

5. The cable pulling system of claim 4, wherein:
said motor is a hydraulic motor.

6. The cable pulling system of claim 4 further comprising:
at least one hydraulic fitting for attaching the motor to a hydraulic system.

7. The cable pulling system of claim 4, wherein:
said coupling comprises two cross member rods attached in elevated positions above the housing.

8. A cable pulling system comprising:
a motor connected to a drive shaft;
said drive shaft extending from a side of said motor and being oriented in a horizontal position;
said drive shaft extends from the motor through the side of the housing to the capstan;

a capstan located on said drive shaft and actuated via said drive shaft and said motor;

said motor is contained within a housing having a top panel, a bottom panel, a front panel, a rear panel and side panels;

said drive shaft extends from the motor through one of the side panels of the housing to the capstan;

said capstan is located outside of the housing in a vertical position parallel to the side panels of the housing; and a coupling fixedly attached to the housing wherein said coupling is located centrally on the housing between the side panels of the housing, thereby placing the capstan in an offset position in relation to the coupling; and a boom attached to the coupling and extending away from the housing and coupling; and said coupling comprises two cross member rods attached in elevated positions above the housing which engage an end of the boom.

\* \* \* \* \*